Sept. 4, 1962 L. J. VANDERBERG 3,052,841
VARIABLE VOLTAGE INDICATING SYSTEM
Filed July 25, 1958
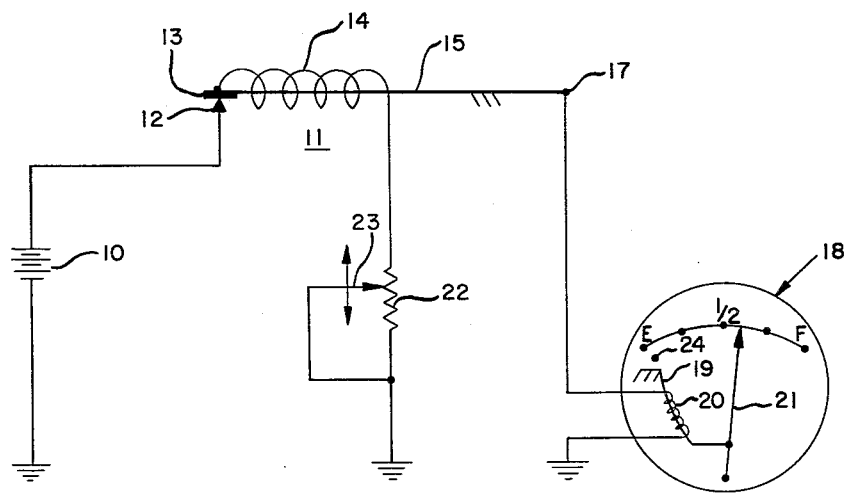
L. J. VANDERBERG
INVENTOR.
BY E. C. McRae
J. C. Faulkner
J. H. Oster
ATTORNEYS United States Patent Office 3,052,841
Patented Sept. 4, 1962

3,052,841
VARIABLE VOLTAGE INDICATING SYSTEM
Lawrence J. Vanderberg, Ann Arbor, Mich., assignor to Ford Motor Company, Dearborn, Mich., a corporation of Delaware
Filed July 25, 1958, Ser. No. 750,906
7 Claims. (Cl. 324—62)

This invention pertains to electric indicating systems and more particularly to a variable voltage regulating gauge system.

It has as an object a provision of a gauge system wherein linear components may be employed.

An advantage of this invention is that it permits the employment of the linear portion of a thermal volt meter.

A further advantage lies in the utilization of linear sending unit.

These and other objects and advantages of this invention will become apparent from the following description of an embodiment taken together with the single FIGURE of the drawing.

A thermostatic voltage regulator may be of the type described in U.S. Patent No. 2,762,997 and includes a pair of normally closed contacts 12 and 13, a bimetal spring 15 and a heating element 14. Contact 12 is connected to battery 10, contact 13 is electrically connected to bimetal spring 15 and to one end of the heating element 14.

In series with heating element 14 is a sending unit 22 which, as illustrated, takes the form of a potentiometer with a wiper arm 23. It is understood that any suitable variable impedance sending device may be used in place of a potentiometer. The position of wiper arm 23 may be conveniently controlled as by a float in a gasoline tank. Bimetal spring 15 includes a terminal 17 to which integrating volt meter 18 is connected.

Volt meter 18 may conveniently be of the thermal type wherein R.M.S. voltage is indicated. A bimetal spring 19 includes a free end pivotally connected to indicator arm 21 around which is formed high resistance heating coil 20. A stop pin 24 is provided to define the minimum meter reading.

In the operation of this invention, power from battery 10 is applied to contact 12, through contact 13, to winding 14, and to ground through sending unit 22. The current through winding 14 heats bimetal spring 15 until it causes contact 13 to break away from contact 12. Subsequent cooling of spring 15 closes contacts 12 and 13 and the cycle is repeated. The voltage at terminal 17 has, therefore, a square waveform, the peak amplitude of which corresponds to battery 10 voltage and the frequency of which is determined by the periodicity of the cycling of the bimetal.

The average or R.M.S. voltage at terminal 17 (at any given position of arm 23) is a regulated voltage since any change in battery 10 potential causes a corresponding change in the duration of the closed contact period as compared to the open period. This is, in a sense, a constant current device in that the regulator maintains a constant average heating current through the fixed resistance of element 14 to maintain the make and break condition and, therefore, the variable voltage at terminal 17 is such as to maintain constant $I^2R$ at the bimetal 15. The R.M.S. value of this regulated voltage is read by the integrating volt meter 18.

Bimetal volt meters are inherently non-linear at the low end of the voltage scale. Therefore, stop pin 24 is provided which prevents the movement of pointer 21 into the non-linear region. The movement is said to have a depressed zero point. The amount of voltage which is necessary to move pointer 21 from stop pin 24 is the R.M.S. voltage at terminal 17 when the sending unit 22 impedance is minimum. Therefore, since only the linear portion of volt meter 14 is utilized, the potentiometer within sending unit 22 may have a linear resistance curve.

By way of example and llustration only and intended as in no way limiting the scope of the invention, the following electrical values are offered: Battery 10 provides a nominal 12 volts which may vary between nine and 15 volts. Heating element 14 has a resistance of 40 ohms and unit 22 is linearly variable between zero and 50 ohms. With arm 23 at zero ohm, the regulated voltage at terminal 17 may be selected as four volts in accordance with the adjustment of contact points 12 and 13 as well known in the art. This corresponds to the voltage to which pointer 21 coincides with stop pin 24. With potentiometer wiper arm 23 at 50 ohms, the regulated output of regulator 11 is nine volts which corresponds to full scale on meter 18.

It is, therefore, seen that this invention provides an indicating gauge system wherein the linear range of a bimetal volt meter may be employed by measuring the voltage across the combination of a fixed regulating resistance in a regulator in series with the linearly variable impedance in a sending unit. However, it is within the purview of this invention to measure the voltage across unit 22 alone with the utilization of a relatively high impedance volt meter having linear characteristics. By measuring the voltage across both element 14 and unit 22, a minimum regulated voltage is maintained which may be used to obviate the effects of meter non-linearity at the low end of the scale.

It will be understood that the invention is not to be limited to the exact construction shown and described, but that various changes and modifications may be made without departing from the spirit and scope of the invention, as defined in the appended claims.

What is claimed is:

1. An instrument system comprising a thermal voltage regulator actuated by an electrical heater of fixed resistance, a sending unit of variable resistance connected in series with said heater, a source of E.M.F. connected to supply current to said sending unit through said heater, and a thermal volt meter having a depressed zero point connected to read the sum of the voltages across said heater and unit whereby the fixed voltage maintained across said heater overcomes the depressed zero point of said meter, said thermal volt meter including means for linearly registering the changes in resistance of said sending unit after said depressed zero point has been overcome.

2. An instrument system comprising a regulator having a fixed regulating resistance, a source of E.M.F., a variable resistance sensing unit connected to said source through said fixed resistance, and a thermal volt meter having a depressed zero point connected to read the sum of the voltages across said resistance and unit whereby the fixed voltage maintained across said regulating resistor overcomes the depressed zero point of said meter, said thermal volt meter including means for linearly registering the change in resistance of said sensing unit after said depressed zero point has been overcome.

3. In an electrical system, a bimetal voltage regulator having a normally closed pair of contacts in series with a heater element, a source of electrical energy, a variable resistance unit, said voltage regulator, said source of electrical energy and said variable resistance unit connected in series, and an R.M.S. volt meter connected to read the sum of the voltages across said heater element and said variable resistance unit, said R.M.S. volt meter being arranged and constructed to register a zero reading when the resistance of said variable resistance unit is a minimum and to linearly register resistance changes in said variable resistance unit above said minimum.

4. In an electrical system, a thermal voltage regulator actuated by an electrical heater element, a variable impedance sending unit connected in series with said heater element, and a thermal volt meter connected across the series combination of said electrical heater element and said variable impedance sending unit, said thermal volt meter including means for registering a zero reading when the impedance of said variable impedance sending unit is a minimum and for linearly registering the changes in impedance of said variable impedance sending unit above said minimum.

5. In an electrical indicating system, a thermal voltage regulator, said thermal voltage regulator including a heater element, a variable impedance sending unit connected in series with said heater element, a thermally responsive indicating means connected across the series combination of said heater element and said variable impedance sending unit, said thermally responsive indicating means including means for registering a zero reading when the impedance of said variable impedance sending unit is a minimum and for linearly registering the changes in impedance of said variable impedance sending unit above said minimum.

6. In an electrical indicating system, a thermal voltage regulator, said thermal voltage regulator including a heater element, a linearly variable impedance sending unit connected in series with said heater element, a thermally responsive indicating means connected across the series combination of said heater element and said linearly variable impedance sending unit, said thermally responsive indicating means including means for registering a zero reading when the impedance of said linearly variable impedance sending unit is a minimum, said thermally responsive indicating means having a linear scale means above said zero reading for linearly registering the changes in impedance of said linearly variable impedance sending unit above said minimum.

7. In an instrument system, a thermal voltage regulator, an electric heater element of fixed impedance connected to actuate said thermal voltage regulator, a linearly variable impedance sending unit connected in series with said electric heater element, a thermal volt meter connected across the series combination of said heater element and said linearly variable impedance sending unit, said thermal volt meter including means for registering a zero reading when the impedance of said linearly variable impedance is a minimum, said thermal volt meter having a linear scale means above said zero reading for linearly registering the changes in the impedance of said linearly variable impedance sending unit above said minimum.

References Cited in the file of this patent

UNITED STATES PATENTS

| | | |
|---|---|---|
| 2,205,637 | Smulski | June 25, 1940 |
| 2,533,769 | Couillard | Dec. 12, 1950 |
| 2,615,085 | Smulski | Oct. 21, 1952 |
| 2,762,997 | Boddy | Sept. 11, 1956 |

FOREIGN PATENTS

| | | |
|---|---|---|
| 741,916 | Germany | Nov. 19, 1943 |